C. E. L. LIPMAN.
DISTRIBUTING VALVE.
APPLICATION FILED JULY 5, 1912.
1,090,827.
Patented Mar. 17, 1914.
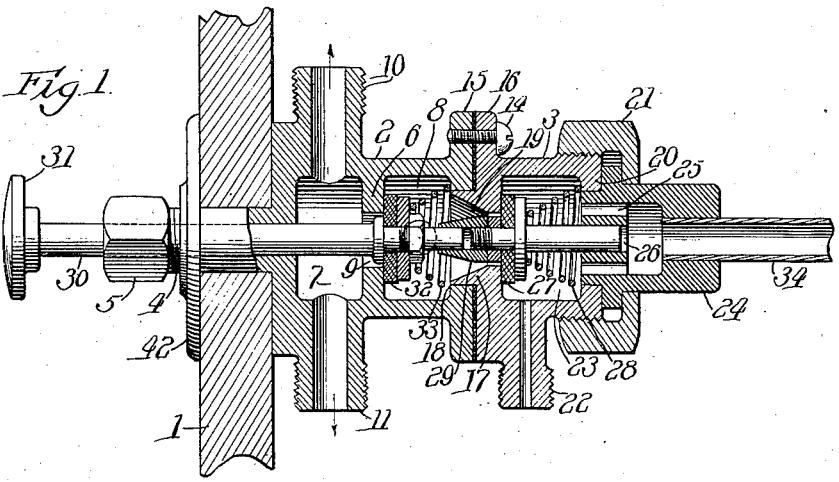
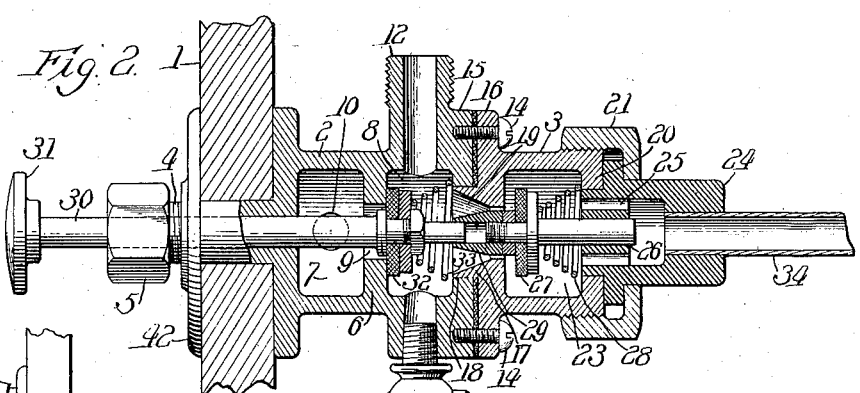
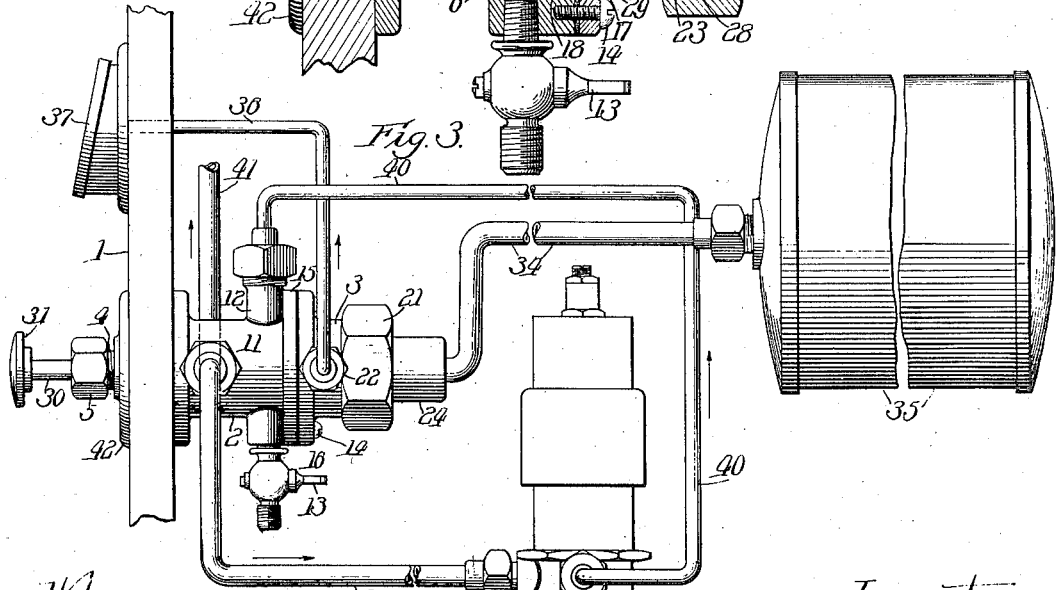
Witnesses:
John H. McCanna Jr.
E. Behel
Inventor:
Carl E. L. Lipman
By A. O. Behel
Atty.

UNITED STATES PATENT OFFICE.

CARL E. L. LIPMAN, OF BELOIT, WISCONSIN, ASSIGNOR TO THE LIPMAN MANUFACTURING COMPANY, OF BELOIT, WISCONSIN, A CORPORATION OF WISCONSIN.

DISTRIBUTING-VALVE.

1,090,827. Specification of Letters Patent. Patented Mar. 17, 1914.

Application filed July 5, 1912. Serial No. 707,901.

*To all whom it may concern:*

Be it known that I, CARL E. L. LIPMAN, a citizen of the United States, residing at Beloit, in the county of Rock and the State of Wisconsin, have invented certain new and useful Improvements in Distributing-Valves, of which the following is a specification.

The object of this invention is to construct a valve for supplying air, especially to a self-starter device for automobiles.

In the accompanying drawings: Figure 1 is a horizontal lengthwise central section through the valve. Fig. 2 is a vertical lengthwise central section through the valve. Fig. 3 shows the connection of the valve with a pump, tank and gage.

The valve is intended to be supported by the dash 1 of an automobile and is inclosed in a casing composed of the main section 2, and the end section 3. The main section 2 has a tubular screw threaded shank 4 which extends through the dash and receives a plate 42 for clamping it to the dash. A packing nut 5 is turned in connection with the shank 4. The main section 2 of the casing is divided by a partition 6 into two compartments 7 and 8, and this partition has a central opening 9. Screw-threaded tubular extensions 10 and 11 communicate with the compartment 7 by their openings extending through the walls of chamber 7, and a screw-threaded extension 12 and a cock 13 communicate with the compartment 8 by their openings extending through the walls of chamber 8. The end section 3 is connected to the main section 2 by screws 14 connecting the flanges 15 and 16. From the flange 16 extends a projection 17 fitted in the opening 18 in the inward continuation of the flange 15. This projection 17 has a central opening 19. The end section has a partially closed end 20, and a screw-threaded cap 21 is turned in connection with the end section. A screw-threaded tubular extension 22 communicates with the chamber 23 of the end section. Between the cap 21 and the end 20 of the end section 2 is held a tubular pipe connection 24 having its inner end formed with a series of holes 25 surrounding a central opening 26. Within the chamber 23 is supported a check-valve 27 held to its seat by the spring 28. This check-valve has a recessed extension 29. A plunger 30 has a cap 31 secured to one end, and to its other end is secured a valve 32 held to its seat by the spring 33. This plunger is supported by the shank 4 in a manner to slide therein, and the inner end of this plunger is located in the recessed extension 29. The valves 27 and 32 are seated when in their normal positions. A pipe 34 connects the connector 24 with the tank 35. A pipe 36 connects the pressure indicator 37 with the tubular extension 22. A pipe 38 connects with the tubular extension 11 and leads to an air pump 39. A pipe 40 leads from the pump 39 and connects with the tubular extension 12.

In the drawings I have not shown the details of construction of the air pump, as such construction forms the subject of a separate application. The air pump is provided with means for starting the pumping of air upon air pressure being admitted to operate said means, and the pipe 38 furnishes the air to the pump. The pipe 41 connects with the extension 10 and supplies air to the starter of an automobile of any suitable construction, which is not deemed necessary to be shown or further described.

Fig. 1 shows the parts in their normal positions in which both valves are seated.

Presuming that the tank 35 contains air under pressure, the indicator 37 will register such pressure as there is always a communication between the tank and indicator, by the pipe 36. When it is desired to operate the starter, the plunger 30 is pushed in, which will unseat both valves 32 and 27, thereby allowing air from the tank to pass out by way of pipe 41 to the starter, and by way of pipe 38 to the air pump. The starter and air pump will be operated at the same time, and when the starter has completed its work the pressure on the plunger 30 is relieved and the spring 33 will close the valve 32. As the air pressure in the tank has been reduced, the air pump 39 will continue to operate and force air into the compartment 8 by way of pipe 40, and into the tank by way of pipe 34. The check valve 27 will be forced open by the ingoing air and will be closed up by the spring 28, when the required pressure has been reached, at which point the pump will be automatically stopped. Should air be required for inflating tires, the plunger 30 is pushed in to supply air for starting the pump, and air may be taken by way of the cock 13 and the pump will continue to run until a given pressure is restored in the tank.

I claim as my invention:

1. A device of the character set forth, comprising a passage leading from an air storage-tank to a starting device, a check-valve located in the passage, a manually operated valve located in the passage to the side of said check-valve nearest the starting device, and an opening in the passage intermediate said valves and communicating with an air-pump, the opening of said manually operated valve unseating the check-valve and opening the passage from the storage-tank to the starting device.

2. A device of the character set forth, comprising a passage leading from an air storage-tank to a starting device, a check-valve located in the passage, a manually operated valve located in the passage to the side of said check-valve nearest the starting device, an opening in the passage to the side of said manually operated valve nearest the starting device and leading to an air-pump, and an opening leading from the air-pump and communicating with said passage at a point intermediate said valves, the opening of said manually operated valve unseating the check-valve and opening the passage from the storage-tank to the starting device, and also communicating the storage-tank with the air-pump through said opening leading to the air-pump.

3. A device of the character set forth, comprising a passage leading from an air storage-tank to a starting device, a check-valve located in said passage at the inlet side thereof from said storage-tank, openings in said passage leading to and from an air-pump, a manually operated valve located in the passage, closing the passage at a point between said air-pump openings; the manually operated valve being adapted to unseat said check-valve and allow air to pass from the storage-tank to the starting device and also to the air-pump.

4. A device of the character set forth, comprising a casing having three compartments, a check-valve located in one end compartment and yieldingly held closed, a manually operated valve located in the center compartment, and an opening leading from the remaining compartment to a starting device; the manually operated valve being adapted to unseat said check-valve and allow air to pass to said starting device.

5. A device of the character set forth, comprising a casing having three compartments, a check-valve located in one end compartment and yieldingly held seated, an opening leading from said end compartment to a storage-tank, a manually operated valve located in the center compartment, an opening leading from the center compartment to the exhaust of an air-pump, and an opening in the remaining compartment leading to said air-pump; the actuation of said manually operated valve unseating said check-valve and allowing air to pass from said storage-tank to the said remaining compartment and thence to said air-pump, causing the air-pump to operate and furnish new air to the storage-tank by way of the center compartment opening and thence through the check-valve.

6. A device of the character set forth, comprising a casing having three compartments, a check-valve located in one end compartment and yieldingly held seated, an opening leading from said end compartment to a storage-tank, a manually operated valve located in the center compartment, an opening leading from said center compartment to an air-pump, an opening in the remaining compartment leading to said air-pump, and a discharge opening leading from said remaining compartment; the actuation of said manually operated valve unseating said check-valve and allowing a flow of air from the supply tank to the discharge opening.

7. A device of the character set forth, comprising a casing having three compartments, a check-valve located in one end compartment and yieldingly held seated, an opening leading from said end compartment to a storage-tank, a manually operated valve located in the center compartment and yieldingly held seated, an opening leading from said center compartment to the exhaust of an air-pump, an opening in the remaining compartment leading to said air-pump, and a discharge opening leading from said remaining compartment; the actuation of said manually operated valve unseating the check-valve and allowing air to pass from the storage-tank to the discharge opening, also from the remaining compartment to the air-pump, thereby starting said pump and furnishing new air to the center compartment, and thence through the check-valve to the storage-tank.

In testimony whereof I have hereunto set my hand in presence of two subscribing witnesses.

CARL E. L. LIPMAN.

Witnesses:
A. O. BEHEL,
JOHN F. MCCANNA, Jr.